United States Patent [19]

Noiles

[11] 3,848,634
[45] Nov. 19, 1974

[54] FLUID CONTROL SYSTEM FOR CONTROLLING INTRAVENOUS FLOW RATE

[75] Inventor: Douglas G. Noiles, New Canaan, Conn.

[73] Assignee: United States Surgical Corporation, Baltimore, Md.

[22] Filed: Aug. 16, 1972

[21] Appl. No.: 280,948

[52] U.S. Cl. .................................. 137/601, 251/8
[51] Int. Cl. ............................................ F16k 7/06
[58] Field of Search .............................. 251/4–10; 137/601; 138/45, 46

[56] References Cited
UNITED STATES PATENTS

| | | | |
|---|---|---|---|
| 2,515,073 | 7/1950 | Binnall et al. | 138/45 |
| 2,573,712 | 11/1951 | Kallam | 251/5 |
| 3,512,748 | 5/1970 | Wilson | 251/8 |
| 3,552,712 | 1/1971 | Whitlock | 251/5 |

FOREIGN PATENTS OR APPLICATIONS

| | | | |
|---|---|---|---|
| 1,306,369 | 9/1962 | France | 251/4 |

*Primary Examiner*—William R. Cline
*Assistant Examiner*—Richard Gerard
*Attorney, Agent, or Firm*—Fleit, Gipple & Jacobson

[57] ABSTRACT

A fluid control system is provided for controlling intravenous flow to a predetermined desired flow rate and for maintaining a stable flow rate for each desired setting with less than a 10 percent deviation in the flow rate from initiation to completion of the administration of a 1,000 ml. intravenous infusion dose.

8 Claims, 4 Drawing Figures

FLUID CONTROL SYSTEM FOR CONTROLLING INTRAVENOUS FLOW RATE

In the administration of intravenous solutions, it is frequently necessary or desirable that a fluid flow of some desired rate be established by clamping a flexible tube with a variable amount of pressure to thereby reduce the size of the flow passage and to control the flow rate. By way of example, reference may be had to U.S. Letters Pat. No. 3,034,504 in which a cam clamp engages a flexible tube for controlling an intravenous flow rate from a bottle to an injection needle. In place of the cam clamp, screw type clamps have been similarly used for the same purpose.

Another example of an intravenous flow control system is that described in commonly assigned U.S. Pat. No. 3,805,830 wherein fluid flow is controlled by clamping a flexible tube defining a plurality of parallel passages.

For reasons not fully understood, when a conventional flexible tube is clamped or squeezed to a degree sufficient to provide an initial desired flow rate, such rate will undesirably decrease over a period of time, thus requiring continuous monitoring and attention by a nurse or other attendant to change the clamp setting and to maintain the flow rate at the desired level. Even with such continuous attention, a desired uniform flow rate is difficult, if not impossible, to attain. It is believed that the cause of the diminishing flow rate is due to a combination of cold flow of the material resulting from the clamping action and/or the capillary action of the fluid passing through the tube.

Experience has also shown that it is extremely difficult when using a conventional flexible tube defining only a single passage therein, to quickly adjust the intravenous flow to the desired rate. Because of the very high sensitivity of such an arrangement, very small adjustments to the clamp result in large changes in the fluid flow rate. Accordingly, it is difficult for the nurse or other attendant to quickly adjust the fluid flow to the desired rate.

The multi-passage conduit described in commonly assigned U.S. Pat. No. 3,805,830 proved to be extremely satisfactory in its performance, and the multi-passage conduit is capable of maintaining intravenous flow within 10 percent of a set rate after one hour. However, the multi-passage conduit described in U.S. Pat. No. 3,805,830 is relatively expensive to fabricate.

Accordingly, an object of the present invention is to provide an intravenous fluid flow system which permits rapid and accurate adjustment to a predetermined desired flow rate.

Another object is to provide a fluid control system which maintains the intravenous flow rate within 10 percent of the desired rate from initiation to completion of the administration of a 1,000 ml. infusion dose.

Still another object is to provide a fluid control system for controlling an intravenous flow rate and wherein the system is inexpensive to manufacture.

Additional objects and advantages of the invention will be set forth in part in the description which follows, and in part will be obvious from the description, or may be learned by practice of the invention. The objects and advantages are realized and attained by means of the instrumentalities and combinations particularly pointed out in the appended claims.

To achieve these and other objects, the present invention provides a fluid control system for controlling an intravenous flow rate, comprising first means for enabling passage of fluid through the first means, second means for enabling passage of fluid through the second means, a third conduit comprised of a resilient material and normally defining an interior flow passage of non-circular cross section in fluid communication with the first and second means and means in operative relationship with the third conduit for enabling rapid and accurate adjustment of the intravenous flow to a predetermined desired flow rate and for maintaining the flow rate substantially constant during a predetermined time period.

Preferably, the wall of the interior flow passage defines a plurality of serrations and the serrations are preferably characterized by a plurality of substantially V-shaped grooves alternately positioned with respect to a plurality of projections. Each of the projections preferably defines an inner and substantially flat surface, and the grooves and projections extend longitudinally of the conduit and in parallel relationship with respect to each other.

Clamp means are also provided for engaging the third conduit and for selectively forming a plurality of longitudinally extending and parallel passages within the third conduit to form a multi-passage element.

By use of the system of this invention, intravenous flow can be maintained within 10 percent of a desired flow rate from initiation to completion of the administration of a 1,000 ml. infusion dose. This is accomplished by providing a conduit having a serrated interior passage whereby the serrations are placed into contact with one another upon clamping of the conduit so as to form a plurality of parallel passages within the conduit. These passages are very small in cross section and in comparison with the diameter of the conduit, and as the multi-passage tube is squeezed, very fine control of the flow rate can be maintained.

It is to be understood that both the foregoing general description and the following detailed description are exemplary and explanatory and are not restrictive of the invention.

The accompanying drawings, which are incorporated in and constitute a part of this specification, illustrate an example of a preferred embodiment of the invention and, together with the description, serve to explain the principles of the invention.

As previously mentioned, it is common practice to utilize a clamp system for selectively squeezing the wall of a resilient tube to vary the flow rate therethrough. However, where a simple conventional tube is used, after the clamp is actuated to produce a given flow rate, such rate drastically diminishes over a period of time. Various tests have been conducted in which a conventional system was employed to deliver a 5 percent dextrose in water solution. The flow rate was initially set at 20 ml. per hour. At the end of the first hour, the rate had dropped to between 50 percent and 60 percent of the original setting, at the end of the second hour to between 37 percent and 44 percent, and at the end of the third hour to between 8 percent and 24 percent. This obviously is not a desirable situation, particularly when dealing with the intravenous feeding of a patient.

In addition, where a simple conventional tube having a singular passageway therein is used, the sensitivity of the system is extremely high. This makes it very difficult for a nurse or attendant to quickly set the desired intravenous flow rate.

Additional tests have been conducted with a conventional intravenous feeding device for delivering a normal saline solution without the use of an intravenous needle and wherein the solution was delivered to the atmosphere and not against a patient's blood pressure. A vinyl tube was used having an outside diameter of 0.131 inch and a single, circular passageway extending therethrough having a diameter of 0.095 inch. Very small transaxial movement by the clamp results in large changes in the flow rate of this conventional arrangement. For example, movement of the clamp only 0.0055 inch results in a change of the flow rate from 0 to 2,000 ml. per hour. Movement of the clamp 0.011 inch results in a change in the flow rate from 0 to 4,000 ml. per hour. These minute movements of the clamp which result in such large changes in the flow rate make it extremely difficult for the attendant to initially adjust the flow rate to the desired amount.

By use of the present invention, however, the sensitivity of the system is significantly reduced, and the cost of manufacture of the system of this invention is significantly less than that for the system described in U.S. Pat. No. 3,805,830.

Figure 1:
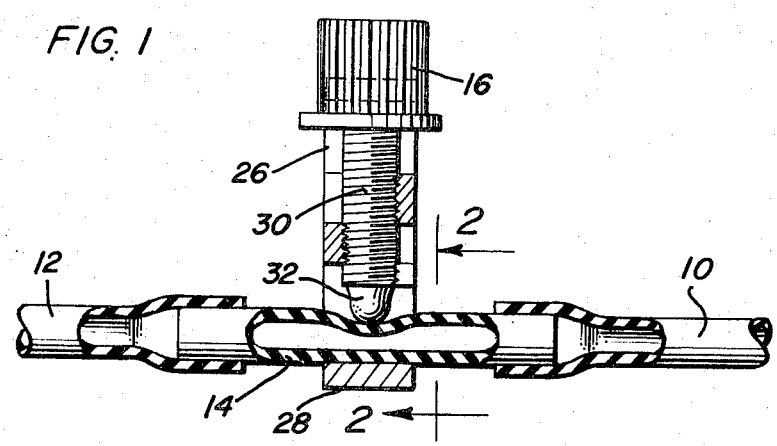
FIG. 1 is a longitudinal cross-sectional view of the fluid flow control system in accordance with the present invention.
Figure 2:
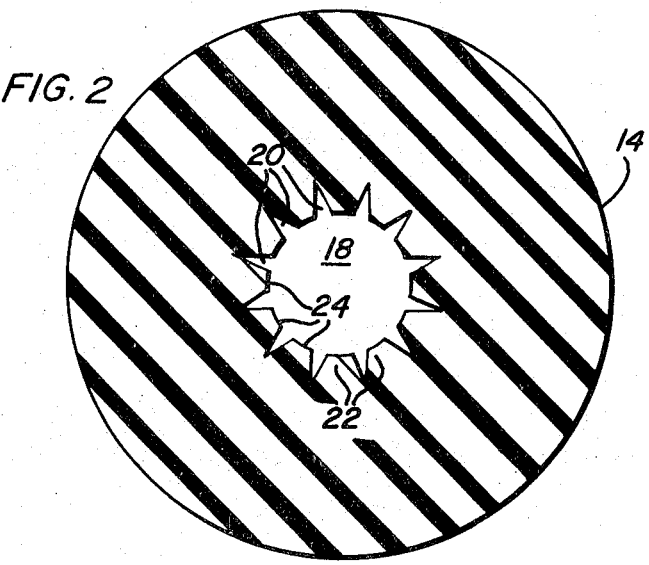
FIG. 2 is a transaxial cross-sectional view taken in the plane indicated by line 2—2 of FIG. 1.

With reference now to the drawings, wherein like reference characters designate like or corresponding parts throughout the several views, there is shown in FIGS. 1 and 2 first means for enabling passage of fluids through the first means, and second means for enabling passage of fluids through the second means. A third conduit is also illustrated in fluid communication with the first and second means and means are in operative relationship with the third conduit for enabling rapid and accurate adjustment of the intravenous flow rate.

As here embodied, the first means include first conduit 10 made of a flexible material, and second means include second conduit 12 made of a similar flexible material.

In accordance with the invention, third conduit 14 is positioned in fixed longitudinal relationship between the first and second conduits, and the third conduit may be inserted into the ends of conduits 10 and 12 in a stretched-fit. Alternatively, third conduit 14 may be cemented or otherwise affixed to conduits 10 and 12.

Figure 3:
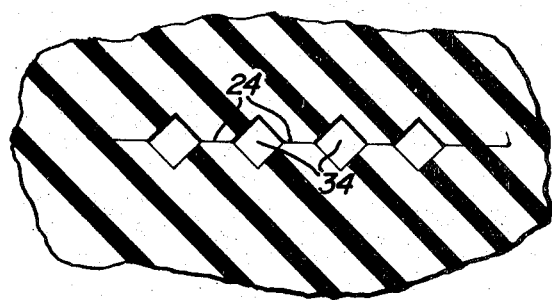
FIG. 3 is a transaxial cross-sectional view taken in the plane indicated by line 2—2 of FIG. 1 and showing the conduit of this invention in one compressed state.
Figure 4:
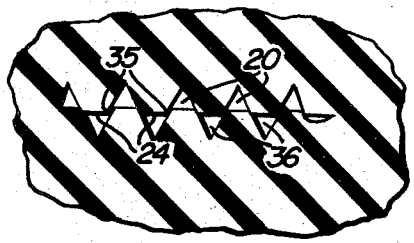
FIG. 4 is a transaxial cross-sectional view taken in the plane indicated by line 2—2 of FIG. 1 and showing the conduit of this invention in a second compressed state wherein the serrations are mismatched.

In accordance with the invention, clamp means are provided for engaging third conduit 14 and for selectively forming a plurality of longitudinally extending parallel passages within the third conduit as illustrated in FIGS. 3 and 4. The clamp means include clamping mechanism 16, which may be of conventional design.

With more specific reference now to FIGS. 2–4, the details of construction of third conduit 14 are illustrated. Conduit 14 is preferably comprised of a natural rubber, a silicon rubber such as sold under the trademark Silastic or any other suitable elastomeric material, and is characterized by an interior passage 18. The wall of the interior passage defines a plurality of serrations. As here embodied, the serrations are characterized by a plurality of substantially V-shaped grooves 20 alternately positioned with respect to a plurality of projections 22. Preferably, each of the projections defines an inner and substantially flat surface 24, and the grooves and projections extend longitudinally of conduit 14 and in parallel relationship with respect to each other.

In operation of the fluid control system of this invention, fluid flows initially through first conduit 10 and then successively through conduits 14 and 12. To selectively control the fluid flow rate, clamping mechanism 16 is positioned in the system to be used in combination with conduit 14. As shown in FIG. 1, such mechanism may include a body 26 having a bottom wall 28 positioned adjacent to one side of conduit 14. Secured to the clamp body and in threaded engagement therewith is a pin or shaft 30 which has a cam surface 32. Pin 30 may be moved from an inoperative position spaced from conduit 14 to an operative clamping position wherein conduit 14 is squeezed between bottom wall 28 and cam surface 32. If desired, bottom wall 28 may have a concave curvature which provides for a greater surface area exposed to the clamping action upon cam actuation, and the portion of the cam surface 32 may have a complementary convex curvature.

When clamp pin 30 is positioned to squeeze conduit 14, the degree of squeezing depends upon the position of cam surface 32 with respect to third conduit 14. As clamp pin 30 and cam surface 32 are gradually moved to compress conduit 14, interior passage 18 is gradually compressed. As the passage decreases in size, the flow rate of fluid through the passage also decreases. Ultimately, the squeezing action of clamp pin 30 causes conduit 14 to assume either the compressed position illustrated in FIG. 3 or the compressed position illustrated in FIG. 4.

If conduit 14 is compressed to the position illustrated in FIG. 3, surfaces 24 are positioned in contacting relationship to form a plurality of individual passages 34. As the clamp pin 30 continues to compress conduit 14, each of the individual passages 34 is slowly compressed until finally the flow of fluid through conduit 14 is completely stopped.

Alternatively, the clamping action of pin 30 may cause the serrations of conduit 14 to be positioned as illustrated in FIG. 4. In this example, the edges 35 of surfaces 24 engage the walls of V-shaped grooves 20 so as to form a plurality of passages 36 through which the fluid may flow. As clamp pin 30 continues to compress conduit 14, passages 36 are also gradually compressed until fluid flow through conduit 14 is completely stopped.

Thus, in the construction of conduit 14, a plurality of passages is formed when conduit 14 is suitably compressed and the flow of fluid through the system and through conduit 14 can be accurately controlled and maintained. In fact, the flow rate of fluid through conduit 14 and through the system of this invention does not deviate from the desired value more than 10% from initiation to completion of the administration of an intravenous infusion dose of approximately 1,000 ml.

Thus, the present invention provides for a fluid control system for enabling rapid and accurate adjustment of intravenous fluid flow to a predetermined desired flow rate and for maintaining that flow substantially constant during a predetermined and relatively extensive time period. This system is especially adapted for the careful control required for intravenous feeding within the conventional and intravenous flow range of from 0 to 2,000 ml. per hour. The flow rate may vary within this range depending upon the patient and the purpose of the intravenous feeding. For example, 1,500 ml. per hour is representative of the rate used during anaesthesia, 600 – 1,000 ml. per hour when the flow is forced and 10 to 400 ml. per hour is the normal rate used for conventional intravenous feeding. Furthermore, the present invention provides for such desired flow rate control while at the same time providing for inexpensive manufacture of conduit 14 by extrusion or other economical methods.

The invention in its broader aspects is not limited to the specific details shown and described, and departures may be made from such details without departing from the principles of the invention and without sacrificing its chief advantages.

What is claimed is:

1. A fluid control system for controlling the flow rate of a parenteral fluid from a parenteral fluid reservoir to means for feeding the parenteral fluid into a patient's body, comprising:

first conduit means for passing parenteral fluid therethrough;

second conduit means for passing parenteral fluid therethrough in spaced relation to said first conduit means;

third conduit means comprised of a resilient material having an interior opening of non-circular cross section, said interior opening having a shape such that compression of said third conduit means forms a plurality of parallel, longitudinally extending flow passages each of which is in parenteral fluid communication with said first and second conduit means; and a compression clamp in operative relationship with said third conduit means for transaxially compressing said third conduit means to form said plurality of flow passages and for varying the combined cross-sectional area of said flow passages between a maximum and a minimum, said compression clamp having means for manually setting the extent of compression on said third conduit means, said compression clamp further capable of maintaining said compression substantially constant until manually reset, said third conduit means and said compression clamp together forming a valve which is suitably sized for controlling the flow rate of said parenteral fluid and for maintaining said flow rate substantially constant during a predetermined time period.

2. A system as in claim 1 wherein the wall of said interior opening defines a plurality of serrations.

3. A system as in claim 2 wherein said serrations are characterized by a plurality of substantially V-shaped grooves alternately positioned with respect to a plurality of projections.

4. A system as in claim 3 wherein said projections each define an inner and substantially flat surface.

5. A system as in claim 4 wherein said grooves and said projections extend longitudinally of said conduit and in parallel relationship with respect to each other.

6. A system as in claim 1 wherein said first conduit means includes a first conduit having a longitudinally extending flow passage therein and wherein said second conduit means includes a second conduit having a longitudinally extending flow passage therein.

7. A system as in claim 6 wherein said first and second conduits are in spaced relation relative to each other and wherein said third conduit means is in fixed longitudinal relationship between said first and second conduits.

8. A system as in claim 1 wherein said third conduit is comprised of elastomeric material.

* * * * *